(12) United States Patent
Campbell et al.

(10) Patent No.: US 8,815,191 B2
(45) Date of Patent: Aug. 26, 2014

(54) PROCESS FOR PREPARING CATALYSTS INVOLVING THE REGENERATION OF METAL CARBONATE PRECIPITANTS

(75) Inventors: Graeme Douglas Campbell, Clitheroe (GB); James Beaumond Hunter, Holywell (GB)

(73) Assignee: Johnson Matthey Public Limited Company, London (GB)

( * ) Notice: Subject to any disclaimer, the term of this patent is extended or adjusted under 35 U.S.C. 154(b) by 586 days.

(21) Appl. No.: 12/936,067

(22) PCT Filed: Mar. 26, 2009

(86) PCT No.: PCT/GB2009/000789
§ 371 (c)(1),
(2), (4) Date: Dec. 17, 2010

(87) PCT Pub. No.: WO2009/122140
PCT Pub. Date: Oct. 8, 2009

(65) Prior Publication Data
US 2011/0104039 A1    May 5, 2011

(30) Foreign Application Priority Data
Apr. 4, 2008 (GB) .................................. 0806148.3

(51) Int. Cl.
*B01D 53/62* (2006.01)
*B01D 53/86* (2006.01)
*B01D 53/96* (2006.01)
*B01J 37/03* (2006.01)
*B01J 37/08* (2006.01)
*B01J 23/76* (2006.01)

(52) U.S. Cl.
CPC ......... *B01J 37/031* (2013.01); *B01D 2251/304* (2013.01); *B01D 2257/504* (2013.01); *B01D 2251/306* (2013.01); *B01J 37/08* (2013.01); *B01D 53/62* (2013.01); *B01J 23/76* (2013.01); *Y02C 10/04* (2013.01)
USPC ........... 423/220; 423/225; 423/230; 423/232; 423/234

(58) Field of Classification Search
USPC .................................. 423/225, 230, 232, 234
See application file for complete search history.

(56) References Cited

U.S. PATENT DOCUMENTS

2008/0245672 A1 * 10/2008 Little et al. ..................... 205/555

FOREIGN PATENT DOCUMENTS

| CA | 2 469 974 A1 | 12/2005 | |
|---|---|---|---|
| WO | WO-01/26810 A1 | 4/2001 | |
| WO | WO-02/083591 A1 | 10/2002 | |
| WO | WO 2005/108297 | * 11/2005 | .............. C01F 11/18 |
| WO | WO-2006/034339 A1 | 3/2006 | |
| WO | WO-2008/047166 A2 | 4/2008 | |

* cited by examiner

*Primary Examiner* — Stanley Silverman
*Assistant Examiner* — Daniel Berns
(74) *Attorney, Agent, or Firm* — RatnerPrestia

(57) ABSTRACT

A process for manufacturing a catalyst composition includes the steps of
(i) combining one or more soluble metal compounds with a solution of an alkaline metal carbonate precipitant to form a precipitate of insoluble metal carbonates,
(ii) processing the insoluble metal carbonates into a catalyst or catalyst precursor with the evolution of carbon dioxide,
(iii) recovering at least a portion of the evolved carbon dioxide, and
(iv) reacting the recovered carbon dioxide with a suitable alkaline metal compound in an absorber column to generate an alkaline metal carbonate, wherein at least a portion of the generated alkaline metal carbonate is used as a precipitant in step (i).

14 Claims, 1 Drawing Sheet

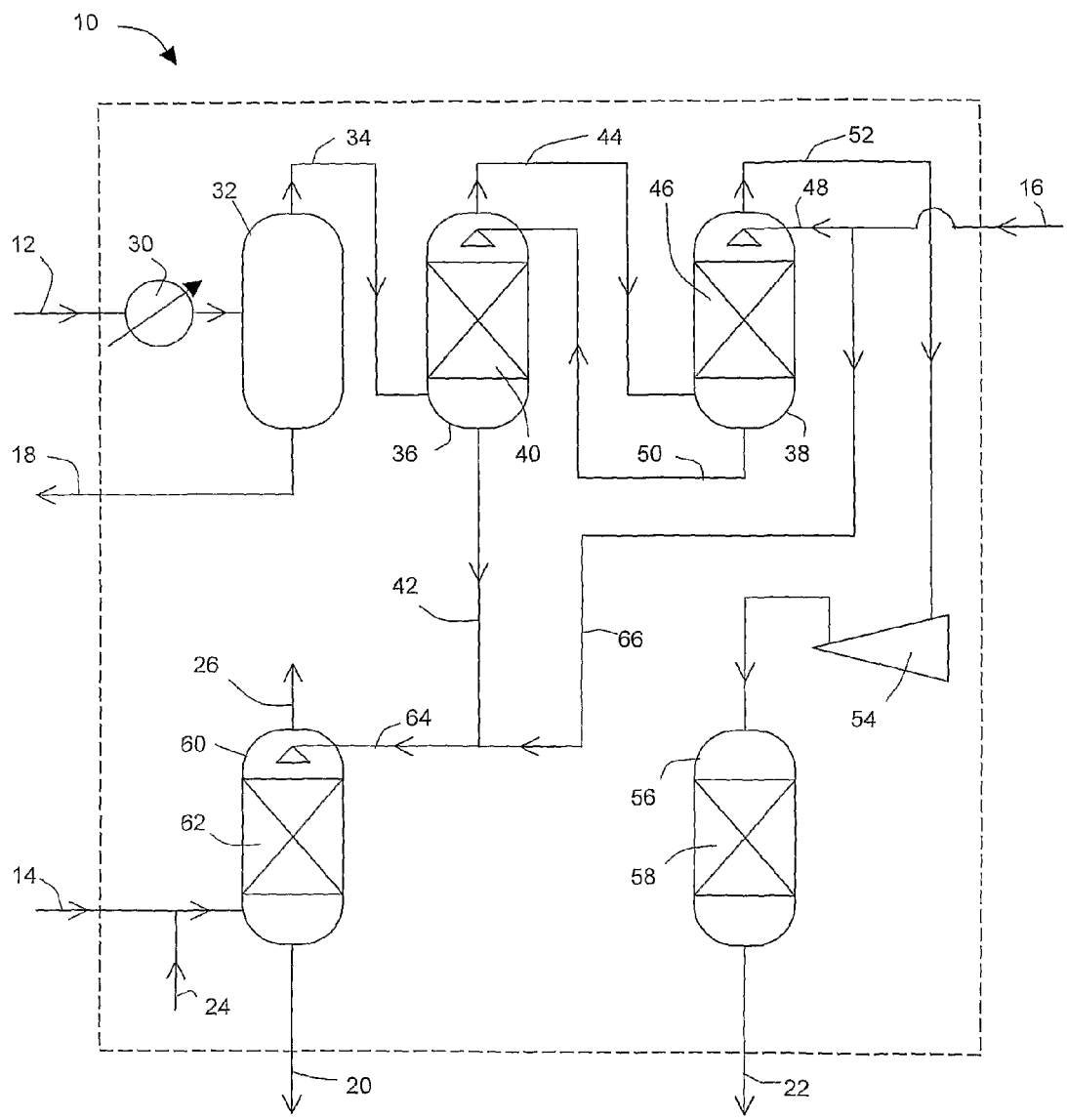

US 8,815,191 B2

PROCESS FOR PREPARING CATALYSTS INVOLVING THE REGENERATION OF METAL CARBONATE PRECIPITANTS

CROSS-REFERENCE TO RELATED APPLICATIONS

This application is the U.S. National Phase application of PCT International Application No. PCT/GB2009/000789, filed Mar. 26, 2009, and claims priority of British Patent Application No. 0806148.3, filed Apr. 4, 2008, the disclosures of both of which are incorporated herein by reference in their entirety for all purposes.

FIELD OF THE INVENTION

This invention relates to a process for preparing precipitated catalyst compositions and in particular to the regeneration of metal carbonate precipitants used in the manufacture of precipitated catalyst compositions.

BACKGROUND OF THE INVENTION

Manufacturing processes whereby catalyst compositions are precipitated using a metal carbonate precipitant are known and typically include the steps of forming an aqueous, often an acidic solution of soluble metal compounds, combining the solution with a metal carbonate precipitant, generally an aqueous solution of an alkali metal carbonate, to effect precipitation of insoluble metal compounds. The insoluble compounds, which generally comprise metal carbonate compounds, are recovered and dried. Calcination, whereby the insoluble compounds are heated to elevated temperature to effect a physiochemical change may also be performed. Furthermore, for certain reducible catalyst compositions, for example those comprising Ni, Cu, Co or Fe, the dried or calcined materials may subsequently be exposed to a reducing gas such as hydrogen or carbon monoxide to convert the metal into its elemental or zero-valent state. Subsequent passivation of the reduced catalyst composition may also be performed.

In the processing of the catalyst composition following precipitation of the insoluble metal compounds, carbon dioxide may be evolved as the metal carbonate compounds decompose. For example partial decomposition of metal hydroxycarbonates may occur on drying and carbon dioxide may be evolved during calcination. Carbon dioxide may also be evolved during reduction of reducible catalyst compositions containing carbonate residues.

SUMMARY OF THE INVENTION

Heretofore the carbon dioxide so-evolved has been discharged as waste gas. We have realised that the evolved carbon dioxide represents a useful raw material that may be re-used to generate the metal precipitant.

Accordingly the invention provides a process for manufacturing a catalyst comprising the steps of
 (i) combining one or more soluble metal compounds with a solution of an alkaline metal carbonate precipitant to form a precipitate of insoluble metal carbonates,
 (ii) processing the insoluble metal carbonates into a catalyst or catalyst precursor with the evolution of carbon dioxide,
 (iii) recovering at least a portion of the evolved carbon dioxide, and
 (iv) reacting the recovered carbon dioxide with a suitable alkaline metal compound in an absorber column to generate an alkaline metal carbonate, wherein at least a portion of the generated alkaline metal carbonate is used as a precipitant in step (i).

BRIEF DESCRIPTION OF THE DRAWINGS

The invention is further illustrated by reference to the following drawings in which FIG. 1 is a diagrammatic flowsheet of a $CO_2$-recovery and alkaline metal carbonate production system according to one embodiment of the invention.

DETAILED DESCRIPTION OF THE INVENTION

By the term "metal carbonate precipitant" we include metal bicarbonate or metal hydrogen carbonate.

By the term "insoluble metal carbonates" we include insoluble metal hydroxycarbonates.

We have found that re-using the carbon dioxide evolved during the catalyst manufacturing process offers savings in terms of raw material costs as well as reducing emissions from catalyst manufacturing facilities.

Insoluble metal carbonates, by which term we include metal hydroxycarbonates, may be precipitated by combining an aqueous solution of one or more soluble metal compounds, such as a metal nitrate, sulphate, acetate, chloride or the like, and an aqueous solution of a metal carbonate precipitant. The solutions may be combined in any manner known to those skilled in the art of catalyst manufacture. Upon combining the metal solution and precipitant solution, the carbonate reacts with the soluble metal compound forming insoluble metal carbonate, including metal hydroxy-carbonate, compounds. The precipitation may be performed at temperatures in the range 0-100° C., preferably 10-90° C. The pH of the combined solution is preferably 6-12, more preferably 7-11.

The insoluble metal carbonates precipitated are desirably compounds suitable for the preparation of catalysts or catalyst precursors. Accordingly, the soluble metal compounds from which they are derived may comprise any of the catalytically active metals found in catalyst or catalyst precursors, including alkali-earth metals, transition metals and non-transition metals. Preferably the soluble metal compounds comprise compounds of metals selected from Ca, Mg, Ti, V, Ce, Zr, Al, La, Y, Mn, Fe, Cr, Co, Ni, Cu, Zn, or Pb. Mixtures of two or more metal compounds may be used.

It may be desirable, in order to enhance the properties of the catalyst or catalyst precursor, to include beside the precipitated metal carbonate compounds other insoluble components in the catalyst composition and therefore a metal oxide thermostabilising material such as a metal oxide powder, gel or sol may be included or formed during the precipitation of the insoluble metal compounds. Alumina, silica, titania, zirconia, ceria and other insoluble metal oxide compounds and/or the corresponding metal hydroxides may be present.

In addition to the catalytic metal compounds and the thermostabilising material the catalyst or catalyst precursor may contain one or more promoters such as an alkali metal compounds, alkali-earth metal compounds, transition metal compounds, rare earth compounds and precious metals.

The alkaline metal carbonate precipitant is preferably a metal carbonate of an alkali metal such as sodium or potassium.

The metal solutions and precipitant may be combined in any order using known methods. Once the metal solution and precipitant solutions are combined and precipitation of insoluble metal compounds has begun, the mixture may be aged. Some carbon dioxide may be evolved during the ageing step. Ageing of the precipitated composition may be performed in the same vessel or on one or more further vessels according to practices known in the art. If desired, a thermo-stabilising material such as a metal oxide may be added during the ageing step and therefore by "during the precipitation" we include any ageing step whereby the precipitated insoluble metal compounds are allowed to age for a period following the precipitation. Ageing may be continued for up to 24 hours, preferably up to 8 hours, more preferably up to 6 hours. The ageing temperature may be in the range 0-100° C., preferably 20-95° C. The ageing pH may be in the range 3-11.

In one embodiment of the present invention, carbon dioxide is recovered from the ageing step and used to prepare the alkaline metal carbonate precipitant.

Once precipitation and any ageing steps are completed, the precipitated compositions comprising the insoluble metal compounds may be recovered by filtration, centrifuge or decanting using known methods.

It is preferable to wash the recovered precipitated composition to remove soluble compounds such as metal salts. Washing may be performed using water, preferably de-mineralised water, at ambient, or preferably, elevated temperature. The recovered solids are then further processed into catalyst or catalyst precursor materials.

The further processing of the insoluble metal compounds into a catalyst or catalyst precursor may include a step of drying the insoluble metal compounds. This may be achieved by heating the damp precipitated material in air or an inert gas to temperatures in the range 25-120° C. in an oven or vacuum oven. The washed catalyst composition may be spray dried using known methods. Drying removes solvent, which is typically water.

The precipitated catalyst compositions comprising the insoluble metal compounds may be further processed by calcining, i.e. by heating them in a calciner to temperatures in the range 200-600° C., preferably 250-400° C. for a period up to 24 hours, preferably up to 8 hours to effect a physiochemical change whereby the insoluble metal carbonate compounds, including metal hydroxycarbonates, are converted into their corresponding oxides with the evolution of carbon dioxide. If desired carbon dioxide may be recovered from the calciner off-gases and used to prepare the alkaline metal carbonate precipitant.

Preferably the catalyst or catalyst precursor is formed into shaped units such as tablets, pellets, granules or extrudates using known methods.

Where the precipitated composition comprising the insoluble metal compounds include one or more reducible metals, it may be further processed by reduction with a reducing gas such as hydrogen or carbon monoxide, or gas mixtures containing these, in a reducer. Inert gases such as nitrogen or argon may be used to dilute the reducing gas. The insoluble compounds may be reduced directly with the evolution of carbon dioxide or may be calcined and then reduced. In one embodiment, the carbon dioxide evolved from the reducer is recovered and used to make the alkaline metal carbonate precipitant.

Carbon dioxide is evolved during one or more steps of the further processing of the precipitated compositions comprising the insoluble metal compounds. This carbon dioxide is recovered from the off gases and is reacted with an alkaline metal compound to form a metal carbonate. The reaction between carbon dioxide and alkaline metal compound may be performed in one or more vessels in series or parallel arrangement preferably containing a suitable packing such as pall rings. Scrubber or absorber column arrangements may be used wherein liquid is fed to the top of the vessel and passes down through a bed of shaped units where it is contacted with the $CO_2$-containing gas passing up through the vessel.

In a preferred embodiment of the present invention, carbon dioxide is recovered from the ageing and/or reduction steps and passed to a $CO_2$ recovery and absorption system comprising a plurality of absorption or scrubbing columns fed with alkali metal hydroxide solutions. Any inert gases such as nitrogen present in the reduction gas stream is therefore unaffected by the $CO_2$-recovery process and may be returned to the reducer. Reduction water is preferably removed from the reducer of-gases prior to contacting the carbon dioxide-containing gas stream with alkali metal hydroxide.

Preferably the alkaline metal compound with which the carbon dioxide is reacted is a compound of an alkali metal, preferably sodium or potassium, most preferably the metal compound is chosen so that the metal carbonate that is formed is the same as that originally used as precipitant. Particularly suitable metal compounds with which the recovered carbon dioxide may be reacted are alkali metal hydroxides.

In FIG. 1, a $CO_2$-recovery and metal carbonate production system 10 is depicted. The system is fed with carbon dioxide-containing streams 12 and 14 from catalyst reducer and ageing vessels respectively, and alkali metal hydroxide stream 16 from storage. Reduction water is recovered from the system via line 18 and may be re-used in the catalyst manufacturing process. 42% wt alkali metal carbonate solution is recovered from the system via line 20 and a hydrogen-containing gas is recovered from the system via line 22. In addition, make up carbon dioxide may be provided to the system via line 24 and waste carbon dioxide removed via line 26.

The mixed off-gases from the reducer, which comprise hydrogen and carbon dioxide, are fed to the system via line 12. The gases are first cooled in heat exchanger 30 to cause the reduction water to condense. The liquid reduction water is separated in a separator 32 and recovered via line 18. The mixed gases comprising hydrogen and carbon dioxide are then fed from the separator via line 34 to two $CO_2$ absorption units 36 and 38 arranged in series. The mixed gas stream 34 is fed near the bottom of a first absorber unit 36 containing a fixed bed of pall rings 40. The mixed gas stream passes up though the bed 40 where it contacts with a descending aqueous stream of mixed alkali metal hydroxide and alkali metal carbonate fed to the first unit 36 from the bottom of second unit 38. A chemical reaction takes place whereby the alkali metal hydroxide reacts with the carbon dioxide to form alkali metal carbonate. The resulting alkali metal carbonate solution, comprising 36% wt alkali metal carbonate and 6% wt alkali metal hydroxide is recovered from the bottom of the first unit 36 via line 42 and cooled by means of a heat exchanger (not shown). The unreacted gas stream, depleted in carbon dioxide, is passed from the top of unit 36 via line 44 to near the bottom of the second unit 38, which contains a further packed bed of pall rings 46. The gas stream then passes up through the bed 46 where it contacts with a descending aqueous stream of alkali metal hydroxide obtained from line 16 and fed to near the top of the second unit via line 48. The remaining carbon dioxide in the gas stream passing through the second unit 38 reacts with the alkali metal hydroxide generating alkali metal carbonate. The resulting mixed alkali metal hydroxide and alkali metal carbonate solution is passed via line 50 from the bottom of the second unit 38 via a cooling heat exchanger (not shown) to near the top of the first unit 34. The remaining hydrogen-containing gas stream is passed from the top of the second unit 38 via line 52 to a compressor 54 and the compressed gas passed to a drying vessel 56 containing a bed of molecular sieves 58 that remove any remaining traces of water. The dried hydrogen-containing gas stream is recovered from the system 10 via line 22.

The gas stream recovered from the ageing vessel, which is substantially carbon dioxide, is conveyed to the system 10 via line 14. Fresh carbon dioxide in line 24 may be mixed with the recovered carbon dioxide in line 14 and the resulting mixture fed to near the bottom of a $CO_2$ scrubbing unit 60 containing a fixed bed of pall rings 62. The carbon dioxide ascends through the bed 62 where it is in contact with a descending mixture of alkali metal carbonate and alkali metal hydroxide fed to near the top of the scrubber unit 60 via line 64. The mixture in line 64 comprises the 36% wt mixed alkali metal carbonate/6% wt alkali metal hydroxide stream 42 recovered from the bottom of the first absorber unit 36 and a fresh 40% wt aqueous alkali metal hydroxide stream 66 obtained from line 16. The carbon dioxide in the gas stream passing through the bed 62 reacts with the alkali metal hydroxide descending through the bed to form alkali metal carbonate. The resulting 42% wt alkali metal carbonate/alkali metal hydroxide mixture is recovered from the bottom of scrubber unit 60 via line 20, cooled if necessary, and fed to a catalyst precipitation unit (not shown). Unreacted carbon dioxide is recovered from the top of the scrubber unit 60 via line 26 and sent to a stack for disposal or recycled to line 14.

Where $CO_2$ recovery is only from one of the ageing vessel or reducer that the relevant section of the unit of FIG. 1 may be removed or suitably adapted.

The invention claimed is:

1. A process for manufacturing a catalyst composition comprising:
   (i) combining a solution of one or more soluble metal compounds with a solution of an alkaline metal carbonate precipitant to form a precipitate of insoluble metal carbonates, wherein a thermostabilising material is present during the precipitation of the insoluble metal carbonates,
   (ii) processing the insoluble metal carbonates and thermostabilising material into a catalyst or catalyst precursor with the evolution of carbon dioxide,
   (iii) recovering at least a portion of the evolved carbon dioxide, and
   (iv) reacting the recovered carbon dioxide with an alkaline metal compound in an absorber column to generate an alkaline metal carbonate, wherein at least a portion of the generated alkaline metal carbonate is used as the alkaline metal carbonate precipitant in step (i).

2. A process according to claim 1 wherein the one or more soluble metal compounds comprises a compound of Ca, Mg, Ti, V, Cr, Mn, Fe, Co, Ni, Cu, Zn, or Pb.

3. A process according to claim 1 wherein the soluble metal compound is selected from a metal chloride, acetate, sulphate or nitrate.

4. A process according to claim 1 wherein the alkaline metal carbonate precipitant is an alkali metal carbonate.

5. A process according to claim 1 wherein the processing of the insoluble metal carbonates into a catalyst or catalyst precursor includes a step of ageing the insoluble metal carbonates.

6. A process according to claim 1 wherein the processing of the insoluble metal carbonates into a catalyst or catalyst precursor includes a step of drying the insoluble metal carbonates.

7. A process according to claim 1 wherein the processing of the insoluble metal carbonates into a catalyst or catalyst precursor includes a step of calcining the insoluble metal carbonates.

8. A process according to claim 1 wherein the insoluble metal carbonates comprise a reducible metal, and the processing of the insoluble metal carbonates into a catalyst or catalyst precursor includes a step of reducing the insoluble metal carbonates.

9. A process according to claim 1 wherein the one or more soluble metal compounds comprises a compound of Mg, Ti, V, Cr, Mn, Fe, Co, Ni, Cu, Zn, or Pb.

10. A process according to claim 1 wherein the processing of the insoluble metal carbonates into a catalyst or catalyst processor comprises:
    ageing the precipitate of the insoluble metal carbonates;
    drying the insoluble metal carbonates;
    calcining the insoluble metal carbonates; and
    reducing the insoluble metal carbonates.

11. A process according to claim 10 wherein carbon dioxide is recovered from either or both of the ageing and the reducing steps.

12. A process for manufacturing a catalyst composition comprising:
    (i) combining a solution of one or more soluble metal compounds with a solution of an alkaline metal carbonate precipitant to form a precipitate of insoluble metal carbonates,
    (ii) processing the insoluble metal carbonates into a catalyst or catalyst precursor with the evolution of carbon dioxide,
    (iii) recovering at least a portion of the evolved carbon dioxide, and
    (iv) reacting the recovered carbon dioxide with an alkaline metal compound in an absorber column to generate an alkaline metal carbonate, wherein at least a portion of the generated alkaline metal carbonate is used as the alkaline metal carbonate precipitant in step (i),
    wherein the insoluble metal carbonates comprise a reducible metal, and the processing of the insoluble metal carbonates into a catalyst or catalyst precursor includes a step of reducing the insoluble metal carbonates.

13. A process according to claim 12 wherein the one or more soluble metal compounds comprises a compound of Fe, Co, Ni, or Cu.

14. A process for manufacturing a catalyst composition comprising:
    (i) combining a solution of one or more soluble metal compounds with a solution of an alkaline metal carbonate precipitant to form a precipitate of insoluble metal carbonates,
    (ii) processing the insoluble metal carbonates into a catalyst or catalyst precursor with the evolution of carbon dioxide,
    (iii) recovering at least a portion of the evolved carbon dioxide, and
    (iv) reacting the recovered carbon dioxide with an alkaline metal compound in an absorber column to generate an alkaline metal carbonate, wherein at least a portion of the generated alkaline metal carbonate is used as the alkaline metal carbonate precipitant in step (i),
    wherein the one or more soluble metal compounds comprises a compound of Fe, Co, Ni, or Cu.

\* \* \* \* \*